Patented Nov. 23, 1948

2,454,369

UNITED STATES PATENT OFFICE 2,454,369

CATALYSIS OF HYDROCARBONS

John R. Bates, Swarthmore, Pa., assignor to Houdry Process Corporation, Wilmington, Del., a corporation of Delaware No Drawing. Application June 22, 1944, Serial No. 541,659

10 Claims. (Cl. 196—52)

The present application is in part a continuation of my copending application, Ser. No. 310,762, filed December 23, 1939, and issued as Patent No. 2,429,981, on November 4, 1947.

The present invention relates to new and improved methods of catalytic hydrocarbon conversion and, in particular, to improve catalysts for effecting such conversion.

Catalytic conversion of hydrocarbons such as the catalytic cracking of gas oils and catalytic treating of gasoline has heretofore been known and employed on commercial scale. The economic position of such processes depends to a large extent upon the catalyst employed and, specifically, upon not only the once through activity of the catalyst, but also upon the production of gas and coke which are by-products. While the gas is of some utility, effectively, it may generally be considered as a loss. The coke is loss. Accordingly, one of the best indications of economic utility of a catalyst for hydrocarbon conversion is not the once through activity, but high gasoline to gas and gasoline to coke ratios.

There is, in fact, very little fundamental knowledge or even reliable theory to explain differences in catalytic activity of the adsorbent type catalyst employed in hydrocarbon conversion. For this reason progress along this line has been, and for some years to come will undoubtedly be, along empirical lines. The activity or lack of activity of any single component or couple of components cannot be considered as a criterion of what the activity will be when combined with other specific material. Accordingly, improvements in catalysis along this line must proceed purely on the basis of trial and experiment.

Objects of the present invention are to provide new and improved catalysts for the conversion of hydrocarbons; to provide new and improved hydrocarbon conversion methods in which the conversion is effected in the presence of a catalyst; and to provide new and improved methods for the catalytic cracking of hydrocarbons and for the catalytic treating of gasoline.

In accordance with a specific form of the present invention a hydrocarbon oil is contacted under conversion conditions with a calcined composite of precipitated hydrous silica containing deposited zirconia and beryllia. The conversion conditions under which the hydrocarbon oil is contacted with the composite are such that gasoline boiling range materials are contained in the effluent and coke-like material is deposited in the composite.

The calcined composite may be produced in a number of ways. Thus, hydrous silica, zirconia, and beryllia may be coprecipitated by mixing solutions of a soluble silicate, of a zirconium salt or a basic solution containing zirconium, such as ammonium zirconium carbonate, and of a beryllium salt or beryllate. In case a relatively stable sol is formed upon mixing solutions of the three, precipitation of a gel or gelatinous precipitate containing the three components may be accelerated either by heating or by the addition of a setting agent such as ammonium sulfate.

Alternative methods for the production of the composite involve the coprecipitation of silica together with either the zirconia or the beryllia and the deposition of the other upon the coprecipitate. This deposition may be effected by suspending the coprecipitate, in the moist hydrogel state, in a solution of a compound of the third component of the composite, followed by the precipitation thereof upon the hydrogel. Deposition may likewise be effected, particularly in the case of depositing beryllia upon the silica-zirconia, by drying the silica-zirconia, removing alkali metal from the silica-zirconia, dipping the dried gel in a solution of a beryllium salt such as beryllium sulfate, and calcining to decompose the beryllium sulfate carried by the silica-zirconia to beryllia.

The composite may likewise be prepared by separate precipitation of the silica, zirconia, and beryllia and mixing of the separate precipitates or by the coimpregnation of silica gel either in the moist undried gel state or in the purified dried gel state with a solution containing compounds of both zirconium and beryllium.

Regardless of the specific method of preparation, the composites should be substantially freed of alkali metal materials prior to calcination. As is known in the art of silicious cracking catalysts, freedom from alkali metal is desirable in order to stabilize the activity of the catalyst. Removal of alkali metal may be effected by washing the gel containing alkali metal either before or after drying. In some instances treatment with ammonium salts such as ammonium chloride or sulfate or with an acid such as hydrochloric acid is of assistance in removing the alkali metal.

The catalyst is dried to the dried gel state and may then be calcined for use. The gel may be ground either before or after calcination if the composite is to be used in powdered form. In case it is desired to form the composite either by molding or by extrusion into discrete pieces, the composite is ground after drying and then formed into a paste which is either molded or extruded prior to calcination. Another form of catalyst is the so-called "bead" type catalyst in which the hydrogel structure is not broken down, but is carried through into the final form. When it is desired to employ this type of catalyst, the alkali metal is removed from the hydrogel beads by dialysis and the purified hydrogel beads are then dried and calcined. In any case, the calcination need not precede hydrocarbon conversion inasmuch as the first regeneration of the catalyst will effect the necessary calcination so that after the initial run, all further runs will be in the presence of calcined composite.

The catalyst is preferably pre-calcined at a temperature between 800 and 1700° F. The pre-calcination may be in accordance with the process described in my Patent No. 2,375,757 dated May 15, 1945 in which steam is present in amount equal to 0.3 pound per square inch partial pressure or more, or in accordance with the process described in application, Ser. No. 538,711, filed June 3, 1944 of H. A. Shabaker, and now abandoned, in which water vapor is substantially excluded during the heat treatment which is effected in the high temperature range between about 1500 and 1700° F., following which, if desired, it may be calcined under the conditions stated in my Patent No. 2,375,757.

The hydrocarbon oil is contacted with the catalyst under vapor phase conversion conditions such that gasoline is contained in the effluent and coke-like material is deposited in the catalyst. An important aspect of this invention involves the charging of a hydrocarbon oil higher boiling than gasoline under cracking conditions, suitable conditions being known in the art. The present invention is of outstanding benefit in the cracking of heavy hydrocarbon oils such as those having a mid or 50% boiling point above 650° F. A particular problem in catalytically cracking such heavy oils has been the production of excessive gas and coke. By employing the present invention, high activity catalysts may be employed for the cracking of heavy stocks without excessive production of either gas or coke.

*Example 1*

An active heat stable and regenerative catalyst consisting essentially of substantially pure silica, zirconia, and beryllia in the approximate molar ratio of 15:1:0.9 was prepared. To obtain this material an ammoniacal solution containing approximately 1700 parts by weight of commercial sodium silicate was mixed with a solution containing about 270 parts by weight of zirconium sulfate and 98 parts by weight of beryllium sulfate and of the order of 120 parts by weight of ammonium sulfate. In about half a minute an opalescent gel, having a pH value of the order of 6.4, was formed. This gel was filtered, dried, washed and treated with a solution of ammonium chloride until its total sodium oxide content was reduced to below 0.5% by weight. After again washing, this material was heat treated for about 2 hours at controlled temperature of the order of 1100° F. The catalyst was then utilized for cracking a light gas oil at a catalyst temperature of 800° F. at atmospheric pressure and at a space rate of 1.5. The yield of 400° F. end point gasoline was approximately 40% by volume of the fresh charge.

*Example 2*

A solution was prepared by diluting 15 kilograms of "N-brand" sodium silicate to 65.5 liters with water. A second solution was prepared by dissolving 4.65 kilograms of zirconium sulfate, 0.375 liter of 95% sulfuric acid and 0.74 kilogram of beryllium sulfate ($BeSO_4.4H_2O$) and diluting with water to 34.5 liters. The second solution was poured into the first solution with agitation. A gel began to set in about five minutes. This gel was allowed to stand for two and one half hours to allow syneresis to occur. It was then granulated and syneresis liquor was removed by filtration. The gel was then dried in an oven at 210° F. for 14 hours. The dried gel so produced, which was glassy, was washed with water to remove free alkali metal, then treated with successive washes of ammonium chloride solution to remove residual alkali metal, and then washed with water till the wash water was free of chloride. Following washing the gel was again dried at 210° F. The purified dried gel was ground in a ball mill for 3 hours. The powdered gel was mixed with water to form a paste which was cast in molds in which the paste was dried. The cast pellets were heat treated at 1400° F. for 10 hours in a mixture of 5% steam and 95% air. The catalyst so produced was employed for cracking under the conditions stated in Example 1. A yield of 46.3% gasoline by volume of charge was obtained. Losses to gas and coke were 3.4% and 2.7% by weight, respectively. A total liquid recovery of 99.3% by volume of charge was obtained. This catalyst contained 86.1% silica, 11.8% zirconia, and 2.1% beryllia.

I claim as my invention:

1. The process for the production of normally liquid low boiling hydrocarbons from heavier hydrocarbons by cracking comprising contacting said heavier hydrocarbons under cracking conditions with a calcined composite of precipitated hydrous silica containing deposited zirconia and beryllia.

2. The process according to claim 1 in which the silica and zirconia are coprecipitated.

3. The process for the production of gasoline by the cracking of heavier hydrocarbons which comprises contacting said heavier hydrocarbons under cracking conditions with a calcined composite of coprecipitated silica, zirconia, and beryllia.

4. The process for the production of gasoline boiling range hydrocarbons from heavier than gasoline hydrocarbon materials which comprises contacting said heavier than gasoline hydrocarbons under cracking conditions with a calcined composite of precipitated hydrous silica and hydrous zirconia and containing beryllia deposited therein following drying of the hydrous silica and hydrous zirconia and washing thereof to remove alkali metal material.

5. The process for the production of gasoline boiling range hydrocarbons from hydrocarbon oil heavier than gasoline which comprises contacting said hydrocarbon oil under cracking conditions with a calcined precipitate of precipitated hydrous silica containing deposited zirconia and beryllia which calcined composite is substantially free of alkali metal material.

6. The process for hydrocarbon conversion comprising contacting a hydrocarbon oil under vapor phase conversion conditions such that gasoline boiling range materials are contained in the effluent and coke-like material is deposited, with a calcined composite of precipitated hydrous silica containing deposited zirconia and beryllia.

7. A catalyst for promoting hydrocarbon decomposition consisting of a calcined composite of precipitated hydrous silica containing deposited zirconia and beryllia.

8. A catalyst for promoting hydrocarbon decomposition consisting of a calcined composite of precipitated hydrous silica containing deposited zirconia and beryllia in which the silica and zirconia are coprecipitated.

9. A catalyst for promoting hydrocarbon decomposition consisting of a calcined composite of precipitated hydrous silica containing deposited zirconia and beryllia; the silica, zirconia and beryllia in said catalysts being present approximately in the molar ratio of 15:1:0.9.

10. Process according to claim 6 in which the silica, zirconia and beryllia in said calcined composite are present in approximately the molar ratio of 15:1:0.9.

JOHN R. BATES.

REFERENCES CITED

The following references are of record in the file of this patent:

UNITED STATES PATENTS

| Number | Name | Date |
|---|---|---|
| 2,079,507 | Johnson | May 4, 1937 |
| 2,107,710 | Perkins et al. | Feb. 8, 1938 |
| 2,129,649 | Cross, Jr., et al. | Sept. 13, 1938 |
| 2,129,732 | Fulton et al. | Sept. 13, 1938 |
| 2,214,455 | Egloff et al. | Sept. 10, 1940 |
| 2,280,650 | Kassel | Apr. 21, 1942 |
| 2,281,919 | Connolly | May 5, 1942 |
| 2,289,757 | Connolly | July 14, 1942 |
| 2,289,918 | Lee et al. | July 14, 1942 |
| 2,308,792 | Thomas | Jan. 19, 1943 |
| 2,331,353 | Stoewener et al. | Oct. 12, 1943 |
| 2,340,698 | Ruthruff | Feb. 1, 1944 |